(12) United States Patent
Lu et al.

(10) Patent No.: US 10,714,745 B2
(45) Date of Patent: Jul. 14, 2020

(54) HIGH ENERGY, LONG CYCLE LIFE ELECTRODE FOR LITHIUM-ION BATTERIES

(71) Applicant: UCHICAGO ARGONNE, LLC, Chicago, IL (US)

(72) Inventors: Wenquan Lu, Naperville, IL (US); Linghong Zhang, Aurora, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 106 days.

(21) Appl. No.: 15/663,268

(22) Filed: Jul. 28, 2017

(65) Prior Publication Data

US 2019/0036116 A1    Jan. 31, 2019

(51) Int. Cl.
| | |
|---|---|
| *H01M 4/38* | (2006.01) |
| *H01M 4/66* | (2006.01) |
| *H01M 10/60* | (2014.01) |
| *H01M 4/48* | (2010.01) |
| *H01M 4/13* | (2010.01) |
| *C01B 33/113* | (2006.01) |
| *H01M 10/0525* | (2010.01) |
| *H01M 4/02* | (2006.01) |

(52) U.S. Cl.
CPC .......... *H01M 4/386* (2013.01); *C01B 33/113* (2013.01); *H01M 4/13* (2013.01); *H01M 4/483* (2013.01); *H01M 4/661* (2013.01); *H01M 10/60* (2015.04); *H01M 10/0525* (2013.01); *H01M 2004/021* (2013.01); *H01M 2004/027* (2013.01)

(58) Field of Classification Search
CPC ................. H01M 2004/027; H01M 4/386
See application file for complete search history.

(56) References Cited

U.S. PATENT DOCUMENTS

| | | | |
|---|---|---|---|
| 7,794,681 | B2 | 9/2010 | Fukuoka et al. |
| 9,196,896 | B2 | 11/2015 | Jung et al. |
| 9,287,561 | B2 | 3/2016 | Watanabe et al. |
| 9,570,752 | B2 | 2/2017 | Huang et al. |
| 2011/0086271 | A1* | 4/2011 | Lee ............ H01M 4/134 429/220 |
| 2015/0099174 | A1 | 4/2015 | Ren et al. |
| 2016/0036055 | A1 | 2/2016 | Yamamoto |
| 2016/0197345 | A1 | 7/2016 | Tamaki |
| 2017/0179476 | A1* | 6/2017 | Watanabe ........ H01M 4/0471 |
| 2018/0145316 | A1* | 5/2018 | Moon ............. H01M 4/1393 |

* cited by examiner

*Primary Examiner* — Matthew J Merkling
(74) *Attorney, Agent, or Firm* — Olson & Cepuritis, Ltd.

(57) ABSTRACT

Anodes for electrochemical cells and batteries are described herein. In particular, and anode comprises silicon oxide particles on a transition metal current collector (e.g., copper, nickel, copper alloy, and the like), wherein the particles comprise nanocrystalline domains of silicon dispersed within a silicon oxide matrix. The particles do not include a metal oxide coating, and are produced by heating a silicon monoxide powder at a temperature in the range of about 400 to about 1100° C. under an inert atmosphere for about 2 to about 20 hours. In some embodiments, the particles are free from a metal oxide coating and have an average diameter of about 20 to 10000 nm; the nanocrystalline domains of silicon comprise about 10 to about 90 mole percent of the particles; and the nanocrystalline domains have dimensions of about 0.2 to about 50 nm in average diameter.

7 Claims, 9 Drawing Sheets

HIGH ENERGY, LONG CYCLE LIFE ELECTRODE FOR LITHIUM-ION BATTERIES

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to silicon monoxide materials and particularly to electrode materials for lithium electrochemical cells and batteries. Such cells and batteries are used widely to power numerous devices, for example, portable electronic appliances, medical systems, transportation systems, aerospace systems, defense systems, and stationary energy storage systems.

BACKGROUND OF THE INVENTION

Limited energy resources and the growing demand to decrease greenhouse gas emissions have intensified research of carbon-free energy sources. Batteries that store high-energy densities play a large role in implementation of green energy technologies and non-petroleum vehicular mobility. To date, rechargeable Li-ion batteries (LIBs) offer the highest energy density of any battery technology, and are expected to provide a solution for our future energy-storage requirements. Unfortunately, LIBs have a number of limitations, such as capacity loss over time during long-term cycling due to phase transitions leading to detrimental volume changes in the electrode materials. The energy density of LIBs must be improved in order for the adoption of the technology to be more widespread and economically compelling. One reason LIBs do not provide sufficient energy density is because the electrodes, both the negative electrode (anode), typically graphite, and the positive electrode (cathode), typically, layered $LiMO_2$ (M=Mn, Co, Ni), spinel $LiMn_2O_4$ and olivine $LiFePO_4$, do not offer sufficient capacity or a high enough electrochemical potential to meet energy demands. Thus, there is an increasing need for new LIB technologies to provide higher energy densities than are currently available.

Silicon is considered to be a promising next-generation anode material for LIBs due to its large energy density and natural abundance. However large volume change and poor stability with electrolytes are problems that must still be resolved. Silicon monoxide is considered as an alternative to graphite and silicon to meet the high energy requirements for LIBs. Compared to commercial graphite electrodes, silicon monoxide electrodes offer significantly higher capacity. However, large irreversible capacity loss (ICL) and a limited cycle life for silicon monoxide reduce the energy output and efficiency of the cell, thereby compromising the management of cell/battery operation.

There is an ongoing need for new electrode materials to ameliorate the problems associated with the ICL and limited cycle life of silicon monoxide. The electrodes and electrode materials described herein address this need.

SUMMARY OF THE INVENTION

Electrode materials for electrochemical cells and batteries are described herein. In particular, silicon electrode materials for lithium cells and batteries, preferably silicon monoxide materials for anodes, are described. More specifically, an effective method to increase capacity and improve the cycle life of a silicon monoxide anode is described. The anode comprises silicon oxide particles on a transition metal current collector (e.g., copper, nickel, copper alloy, and the like), wherein the particles comprise nanocrystalline domains of silicon dispersed within a silicon oxide matrix. The particles do not include a metal oxide coating, and are produced by heating a silicon monoxide powder at a temperature in the range of about 200 to about 1100° C. under an inert atmosphere for about 2 to about 20 hours. Preferably, the silicon oxide particles are prepared by heating silicon monoxide at a temperature in the range of about 400 to about 800° C. under an inert atmosphere (e.g., argon) for about 4 to about 18 hours.

The particles are free from a metal oxide coating, and in some embodiments, the nanocrystalline domains of silicon comprise about 10 to about 90 mole percent (mol %) of the particles and have dimensions of about 0.2 to about 50 nanometers (nm) in average diameter as determined by transmission electron microscopy (TEM). The silicon oxide particles typically have an average diameter in the range of about 20 nm to about 10 micrometers (μm) as determined by laser light scattering particle size analysis (e.g., using a CILAS 1090 particle size analyzer). Optionally, particle size can be determined by electron microscopy, e.g., scanning electron microscopy (SEM). In some preferred embodiments the nanocrystalline domains comprise about 30 to about 70 mol % of the silicon oxide particles. Typically, the silicon oxide particles have dimensions of about 100 nm to about 5 μm in average diameter as determined by laser light scattering. The nanocrystalline domains of silicon typically have average diameters of about 1 to about 10 nm as determined by TEM.

The silicon oxide matrix preferably comprises silicon monoxide and silicon dioxide in which nano-sized crystalline domains of silicon (nanocrystalline silicon domains) are embedded. In some embodiments, the nanocrystalline silicon domains are surrounded by silicon dioxide within the silicon oxide matrix, e.g., due to the disproportionation reaction that produces both silicon and silicon dioxide from silicon monoxide. Since the particles and domains typically are not truly spherical, the term "average diameter" as used herein refers to the average size of the particles or domains based on the longest spatial dimension of the particles.

The current collector of the anode can comprise any conductive transition metal. Suitable metals are well known in the lithium battery art, such as, e.g., copper, copper alloys, nickel, and the like, typically in the form of a foil, sheet, plate, or deposited film.

A non-aqueous lithium-ion electrochemical cell comprises a positive electrode, a negative electrode as described herein, a porous separator membrane between the positive electrode and the negative electrode, and a non-aqueous solution of a lithium salt contacting the electrodes and membrane. A non-aqueous lithium-ion battery comprises a plurality of electrochemical cells electrically connected in series, in parallel or in both series and parallel. A positive electrode will typically comprise a current collector (e.g., an aluminum foil) and an active cathode material (e.g., a lithium metal oxide) and some form of carbon (e.g., carbon black) coated on the current collector.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF THE PREFERRED EMBODIMENTS

The present invention relates to heat-treated silicon monoxide materials for use as anode active materials in lithium-ion batteries. The heat-treated silicon monoxide possesses high capacity and good cycle life due to its unique structure containing nano-sized domains of silicon and silicon dioxide. These silicon nano-domains stabilize the silicon and prevent particle fracture during lithiation and delithiation. The heat treatment also alters the nano-domain structures and cleans the surface of the material, which leads to less ICL.

The present invention provides a method for fabricating a silicon monoxide material suitable for use in an electrode of an electrochemical cell. The method comprises heating the silicon monoxide material in a sealed autogenic pressure reactor (i.e., a sealed reactor pressurized by heating) at a temperature and for a period of time sufficient to change the crystallinity and the domain size of silicon and silicon dioxide.

The anode comprises silicon oxide particles that are coated on a transition metal current collector. The particles comprise nanocrystalline domains of silicon dispersed within a silicon oxide matrix. The domains of silicon are integrated with the silicon oxide matrix (i.e., not a mere mixture of silicon and silicon oxide particles). The particles are free from metal oxide (e.g., transition metal oxide or lithium transition metal oxide) particles on the surface of the silicon oxide (i.e., do not include a metal oxide coating), and are produced by heating a silicon monoxide powder at a temperature in the range of about 200 to about 1100° C. under an inert atmosphere for about 2 to about 20 hours under an inert atmosphere (e.g., argon, nitrogen, and the like). In some embodiments the silicon monoxide particles are produced by heating a silicon monoxide powder at a temperature in the range of about 400 to about 800° C. under an inert atmosphere (e.g., argon, nitrogen, and the like) for about 4 to about 18 hours.

The particles are free from a metal oxide coating and have dimensions of about 20 nm to about 10 μm (e.g., 100 nm to about 5 μm) in average diameter as determined by laser light scattering particle size analysis. The nanocrystalline domains of silicon typically comprise about 10 to about 90 mol % (e.g., about 30 to about 70 mol %) of the particle composition. The silicon nanocrystalline domains typically have an average diameter in the range of about 0.2 to about 50 nm (e.g., 0.5 to about 20 nm, or about 1 to about 10 nm) in average diameter as determined by TEM. Optionally the silicon oxide particles can include a carbon coating (e.g., graphite, carbon nanofibers, carbon nanotubes, and the like) of the surface of the particles.

The silicon oxide matrix typically comprises silicon monoxide and silicon dioxide in which nano-sized crystalline domains of silicon (nanocrystalline silicon domains) are embedded. Typically, the silicon nanocrystalline domains are surrounded by silicon dioxide within the silicon oxide matrix, due to a disproportionation reaction that forms silicon and silicon dioxide from silicon monoxide. The silicon domains form and/or expand during heating due to continued disproportionation of silicon monoxide to silicon and silicon dioxide within the silicon monoxide particles.

The current collector for the anode can comprise any conductive transition metal. Suitable metals are well known in the lithium battery art, such as, e.g., copper, copper alloys, nickel, and the like, typically in the form of a foil, sheet, plate, or deposited film. A non-aqueous lithium-ion electrochemical cell comprises a positive electrode, a negative electrode as described herein, a porous separator membrane between the positive electrode and the negative electrode, and a non-aqueous solution of a lithium salt contacting the electrodes and membrane. A non-aqueous lithium-ion battery comprises a plurality of electrochemical cells electrically connected in series, in parallel or in both series and parallel.

The anode can be incorporated in a lithium-ion electrochemical cell also comprising a cathode and a porous separator between the cathode and anode, with an electrolyte in contact with both the anode and cathode, as is well known in the battery art. A battery can be formed by electrically connecting two or more such electrochemical cells in series, parallel or a combination of series and parallel. The electrolyte can include any lithium salt that is suitable for use as a lithium-ion source in electrolytes for lithium-ion batteries, which salts are well known in the secondary battery art. Non-limiting examples of lithium salts useful in the electrolyte compositions described herein include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiTDI), lithium trifluoromethanesulfonate (LiTf), lithium perchlorate (LiClO$_4$), lithium bis(oxalato)borate (LiBOB), lithium difluoro(oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imidate (LIFSI), lithium bis(pentafluoroethylsulfonyl)imidate (LBETI), lithium tetracyanoborate (LiB(CN)$_4$), lithium nitrate, combinations of two or more thereof, and the like. In some preferred embodiment, the lithium salt comprises lithium nitrate in combination with at least one other salt, e.g., LiTFSI. Preferably, the lithium salt is selected from one or more of LiF$_2$BC$_2$O$_4$, LiPF$_6$, LiBF$_4$, LiB(C$_2$O$_4$)$_2$, LiClO$_4$, lithium bis(fluorosulfonyl)imidate (LiFSI), lithium bis(trifluoromethanesulfonyl)imidate (LiTFSi), and LiAsF$_6$. The lithium salt can be present in the electrolyte at any concentration suitable for lithium-ion battery applications, which concentrations are well known in the secondary battery art. In some embodiments, the lithium salt is present in the electrolyte at a concentration in the range of about 0.1 M to about 3 M, e.g., about 0.5 M to 2 M, or 1 M to 1.5M.

The electrolyte also comprises a non-aqueous solvent, wherein the solvent comprises one or more solvent compound selected from an ether, a carbonate ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds. in some embodiments, the solvent comprises a mixture of a cyclic alkylene carbonate and a linear dialkyl carbonate, for example, a mixture of ethylene carbonate and ethyl methyl carbonate (EC/EMC), e.g., in a weight to weight ratio of about 3:7 EC:EMC. Optionally, the electrolyte can include a redox shuttle additive, a stabilizing additive, and the like, which are well known in the lithium battery art.

A cation-permeable separator membrane is situated between the anode and the cathode in contact with the electrolyte. The separator is adapted to allow cations (e.g., Li+) to flow back and forth between the anode and cathode upon charging and discharging of the cell. The separator can be, for example, a cation-permeable membrane, sheet, panel, or film that is permeable to the cations of the electrolytes. Non-limiting examples of suitable separator materials include, NAFION® type ion exchange membranes (sulfonated tetrafluoroethylene-based fluoropolymer-copolymers), other porous polymeric materials such as, for example, sulfonated poly(ether ketones), polysulfones, polyethylene, polypropylene, ethylene-propylene copolymers, polyimides, polyvinyldifluorides, and the like, which can be in the form of membranes, matrix-supported gels, sheets, films, or panels. Other suitable materials include porous ceramics, porous insulated metals, cation-conducting glasses, and zeolites.

Electrochemical cell and battery designs and configurations, cathode materials, as well as electrolyte salts, solvents and other battery or electrode components (e.g., separator membranes, current collectors), which can be used in the electrodes, electrochemical cells and batteries described herein, are well known in the lithium battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

The following examples are provided to further illustrate certain aspects and features of the materials and methods described herein.

Example 1. Preparation of Silicon Monoxide

Silicon monoxide can be synthesized by different methods. Most commonly, commercially available SiO, SiO$_2$ or a Si—SiO$_2$ mixture is heated in an inert gas atmosphere under a reduced pressure in a closed reactor. The process leads to formation of SiO vapor which is transported by an inert carrier gas to the cooler parts of the reactor and condenses, mainly, as silicon monoxide.

Alternatively, silicon dioxide can be reduced with carbon or hydrogen to form silicon monoxide. The process can be represented by the formula: $SiO_2+C \leftrightharpoons SiO+CO$, $SiO_2+H_2 \leftrightharpoons SiO+H_2O$.

Example 2. Heat Treatment of Silicon Monoxide

The silicon monoxide samples are heated from room temperature to a desired temperature of about 200 to about 1100° C. at a rate of about 10° C. in inert atmosphere for a desired time of 2 to 20 hours. The samples are then cooled down to room temperature in inert atmosphere (e.g., argon, nitrogen, and the like).

Figure 1:
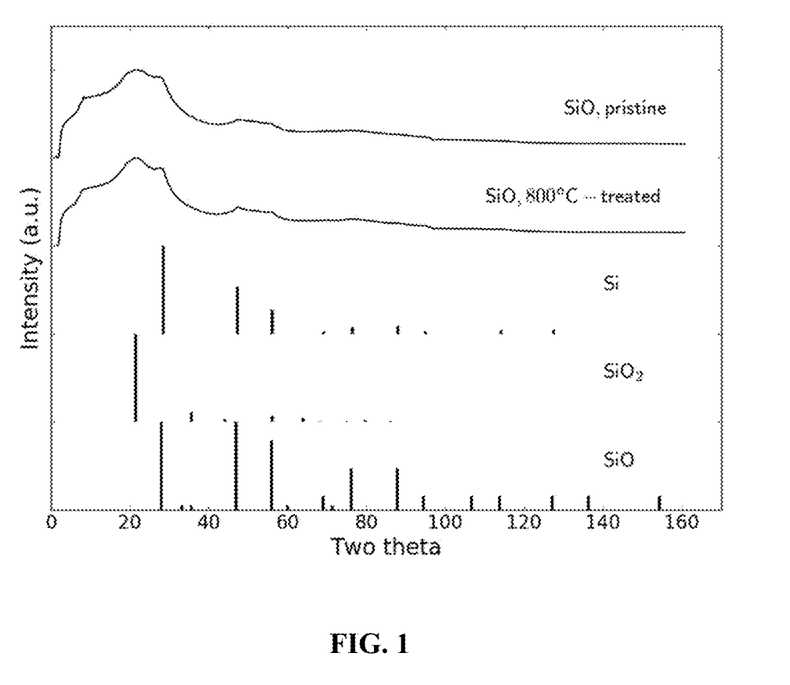
FIG. 1 depicts the X-ray diffraction (XRD) patterns of pristine silicon monoxide and heat-treated silicon monoxide samples along with the XRD patterns for silicon, silicon monoxide and silicon dioxide.

FIG. 1 shows the XRD patterns of pristine and heat-treated silicon monoxide samples along with the patterns for silicon, silicon monoxide and silicon dioxide from the database. The XRD patterns of both pristine and heat-treated silicon monoxide samples match the silicon monoxide from the database. Furthermore, the XRD pattern of silicon monoxide consists of peaks from both silicon and silicon dioxide, which confirms the coexistence of silicon and silicon dioxide domains in silicon monoxide. The peaks become more prominent after the heat treatment, suggesting change of crystallinity and domain size of silicon and silicon dioxide, as well as possible interphase region changes.

Example 3. Electrochemical and Microscopic Evaluation of Heat-Treated Silicon Monoxide The size and microstructure of the heat-treated silicon monoxide were characterized using scanning electron microscopy and transmission electron microscopy. For electrochemical evaluation, the silicon oxide particle samples were first made into electrodes with 20 wt % lithium polyacrylate (LiPAA; pH=6.8) and 10 wt % carbon black, and were then tested in half cells with lithium foil as the counter electrode. The electrolyte for the cells comprised 1.2 M LiPF$_6$ in EC/EMC (weight ratio 3:7) with 10 wt % fluoroethylene carbonate (FEC). The cells were first cycled between about 10 mV and 1.5 V at C/10 rate for 3 cycles (formation cycles), and then evaluated for rate performance. During rate evaluation, the lithiation rate was held constant at C/5 while the delithiation rate was increased from C/5, C/3, C/2, 1C to 2C. Three cycles were performed at each delithiation rate. After the rate test, the cells were subject to a cycle test at C/3. Every 10th cycle was performed at C/10 during the cycle test.

Figure 2:
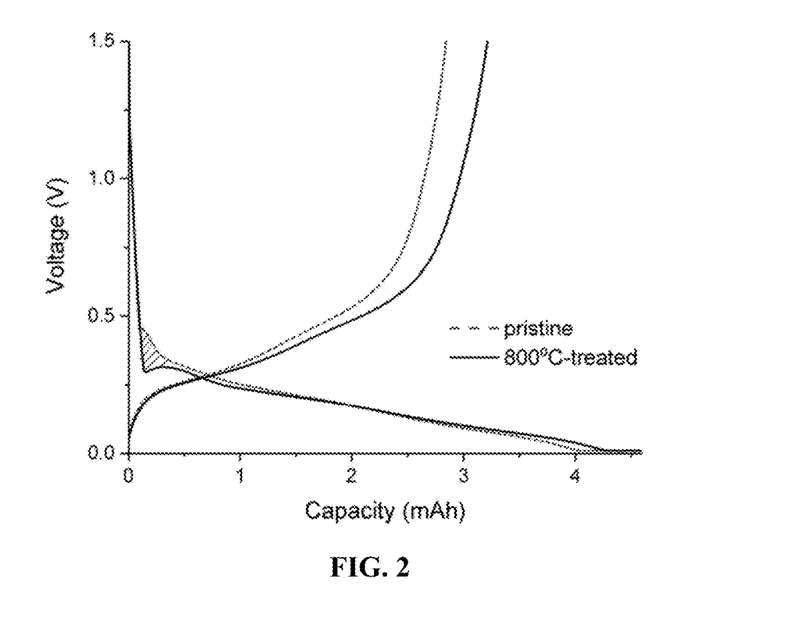
FIG. 2 illustrates the voltage profile of silicon monoxide electrodes during the first lithiation process. The shaded area is the voltage difference between the electrodes using pristine silicon monoxide particles and the electrode with 800° C. treated silicon monoxide particles.

FIG. 2 illustrates the voltage profile of silicon monoxide electrodes during first lithiation process. The shaded area is the voltage difference between the electrodes using pristine silicon monoxide particles and the electrode with 800° C. treated silicon monoxide particles. The lower voltage profile of 800° C. treated sample during this initial lithiation process suggests fewer side reactions for the heat-treated material relative to pristine silicon monoxide, which leads to less ICL. The large ICL of silicon monoxide is an issue that detrimentally affects its application in LIB. Typically, the ICL of silicon monoxide is very high, which makes the electrode balancing very challenging. Pre-lithiation is required to compensate for the ICL of silicon monoxide in order to make full advantage of the high capacity of silicon monoxide electrode. In this study, the ICL of silicon monoxide after 800° C. treatment under Ar was reduced from 35% (for pristine SiO) to 30% (for heat-treated SiO).

Figure 3:
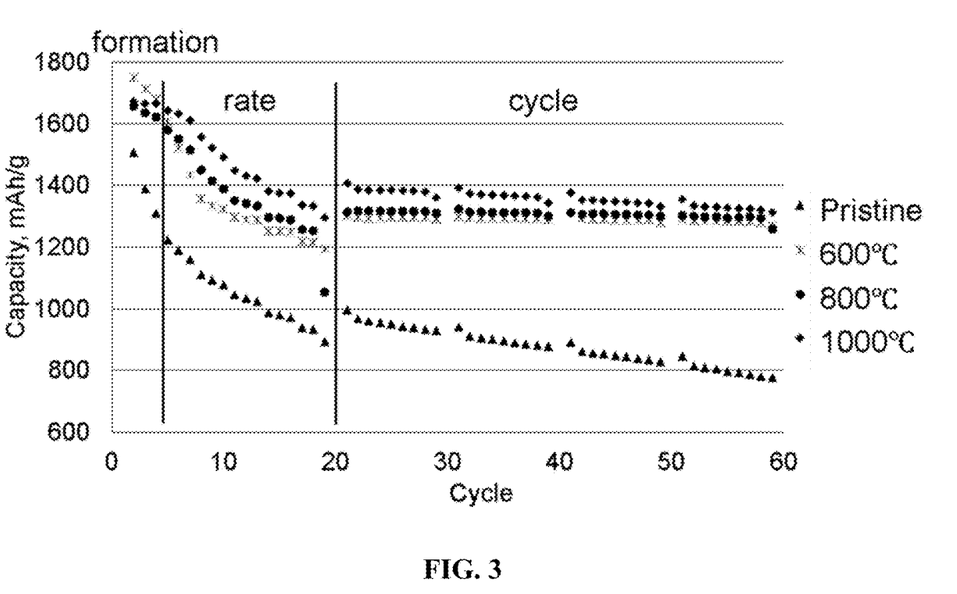
FIG. 3 shows the capacity retention of lithium half cells with pristine silicon monoxide and heat treated silicon monoxide.

FIG. 3 shows the capacity retention of lithium half cells with pristine and heat treated silicon monoxide. The half cells with heat treated silicon monoxide showed excellent capacity retention with almost no capacity fading in 50 cycles. However, the capacity of lithium half cells with pristine silicon monoxide decreased steadily with cycling. Moreover, the specific capacity of heat treated silicon monoxide was also observed at about 1400 mAh/g, which is substantially higher than 1000 mAh/g of the electrodes with pristine silicon monoxide.

Figure 4A:
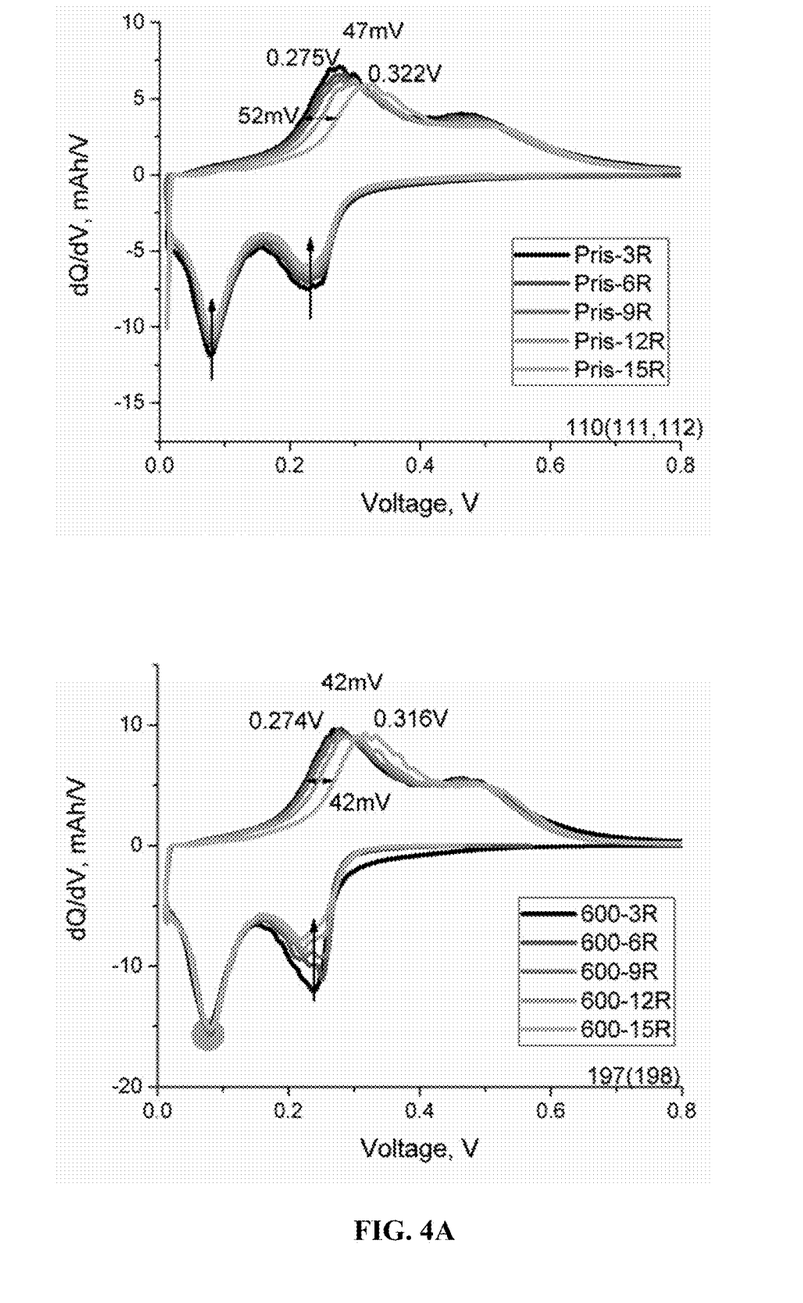
FIG. 4A shows differential capacity plots of silicon monoxide electrodes obtained during rate tests; top: pristine, non-heat-treated silicon oxide; bottom: 600° C. heat-treated silicon oxide
Figure 4B:
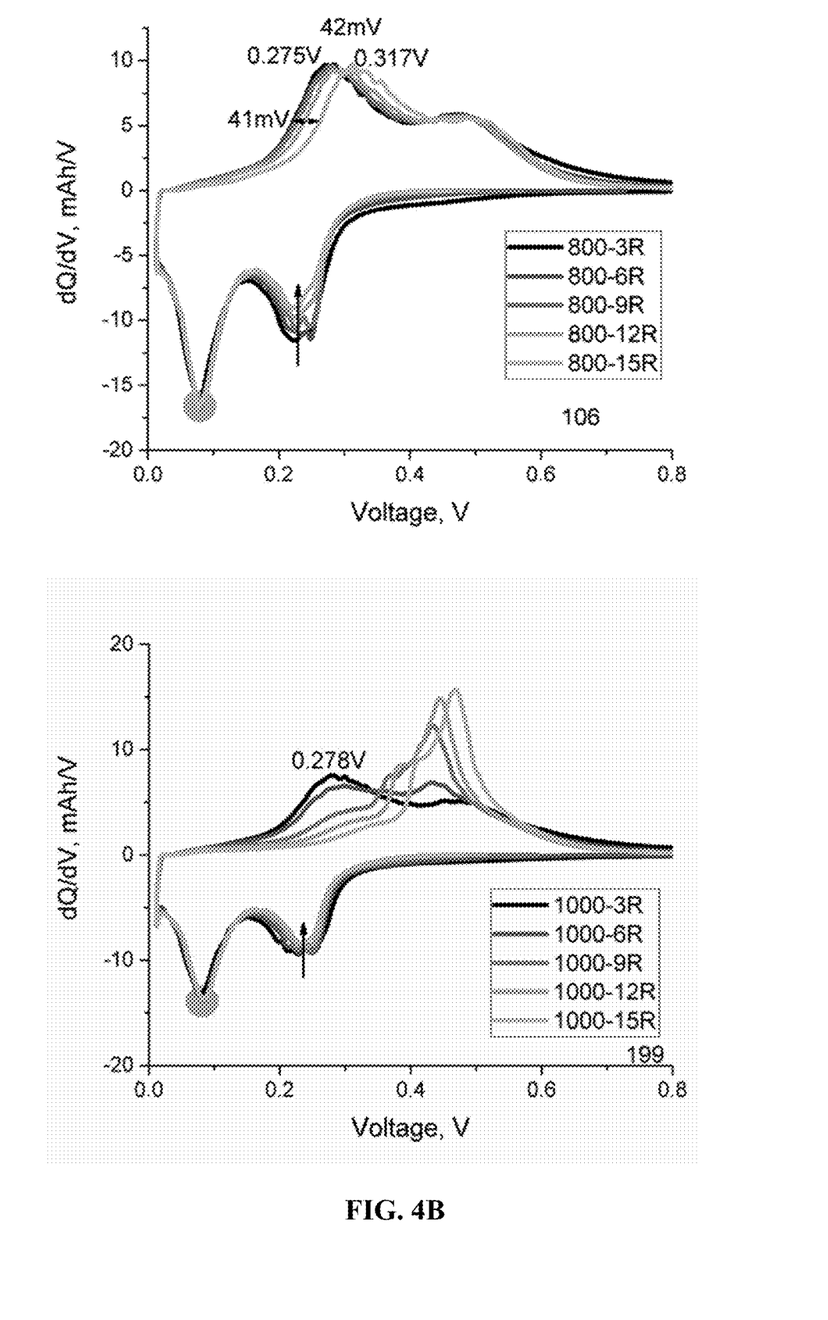
FIG. 4B shows differential capacity plots of silicon monoxide electrodes obtained during rate tests; top: 800° C. heat-treated silicon oxide; bottom: 1000° C. heat-treated silicon oxide.

FIG. 4A and FIG. 4B show differential capacity plots of silicon monoxide electrodes with different heat-treatments, demonstrating good rate performance. The silicon monoxide cells were tested at different delithiation rates of C/5, C/3, C/2, 1C and 2C for 3 cycles each, while the lithiation rate was fixed at C/5. The 3rd cycle of each rate test is shown. The shift of the peaks to lower voltages during lithiation and the shift of the peaks to higher potentials during delithiation were decreased for 600° C.-treated and 800° C.-treated silicon monoxide samples, compared to the pristine silicon monoxide sample, indicating an improvement of rate performance. For silicon monoxide samples heat-treated at 1000° C., two new peaks were observed during high rate delithiation processes, due to a significant increase of the size of the silicon crystalline nanodomains.

Figure 5A:
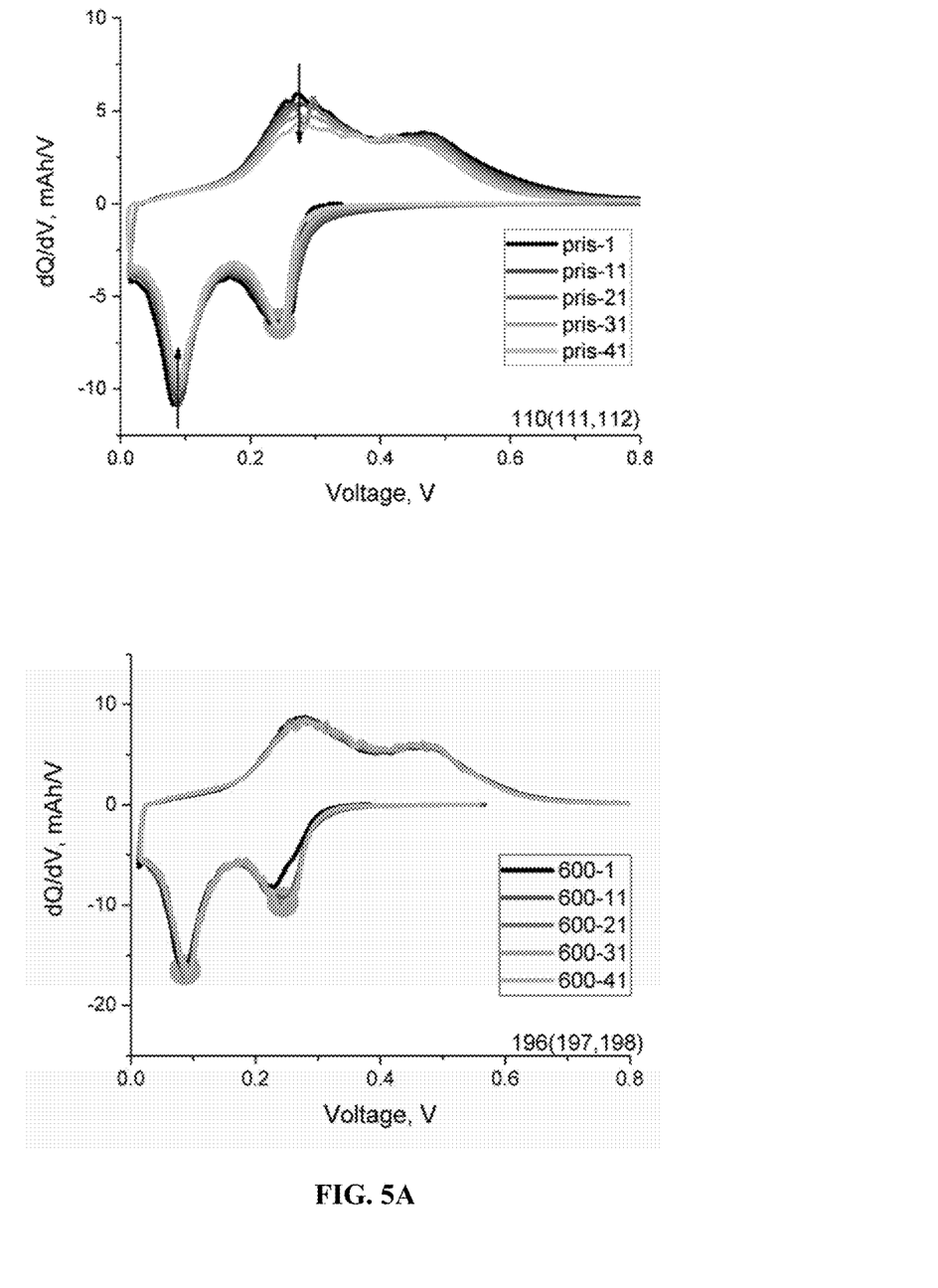
FIG. 5A shows differential capacity plots of silicon monoxide electrodes obtained during cycling tests; top: pristine, non-heat-treated silicon oxide; bottom: 600° C. heat-treated silicon oxide.
Figure 5B:
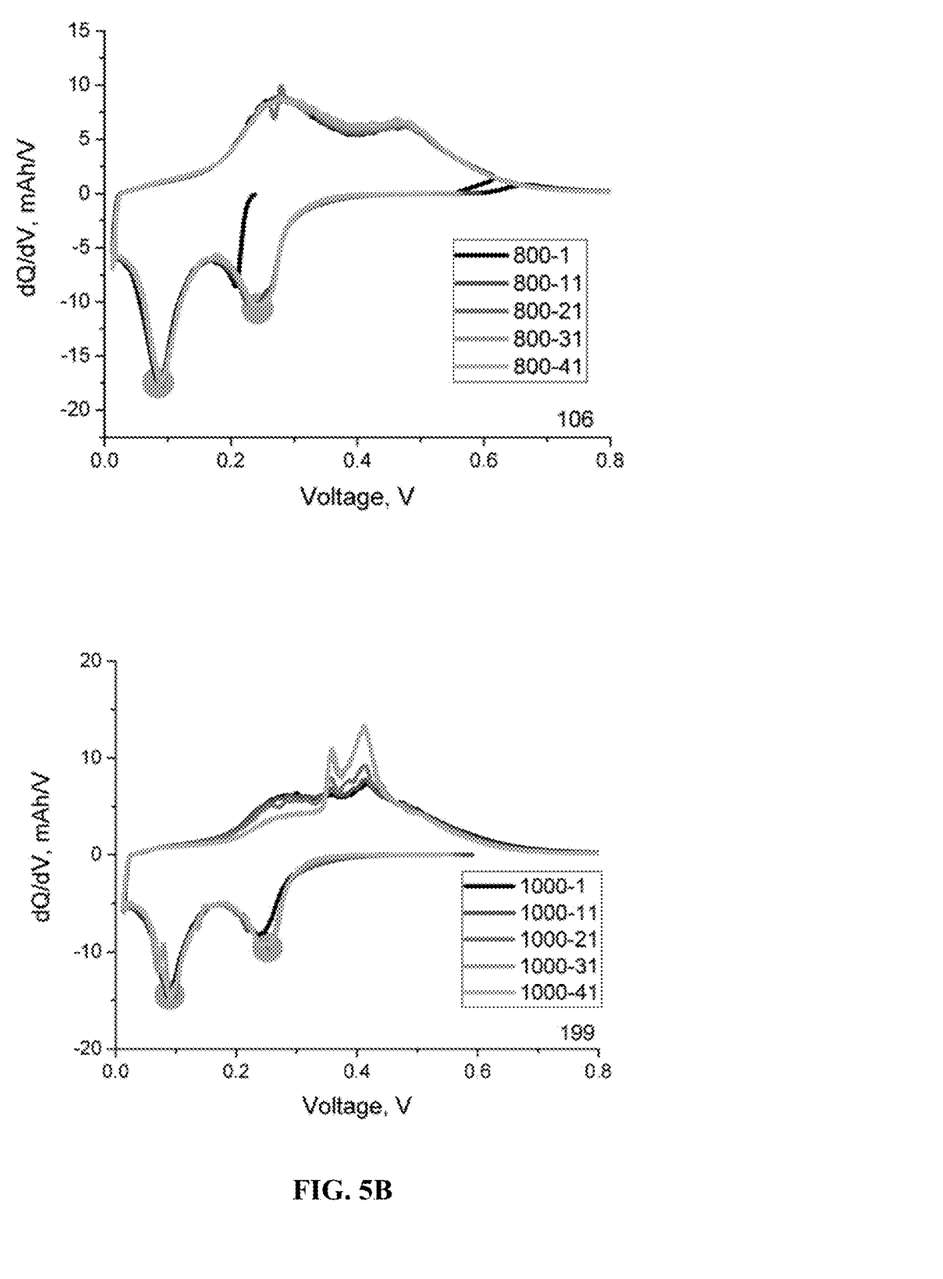
FIG. 5B shows differential capacity plots of silicon monoxide electrodes obtained during cycling tests; top: 800° C. heat-treated silicon oxide; bottom: 1000° C. heat-treated silicon oxide.

FIG. 5A and FIG. 5B show the evolution of differential capacity plots during a cycle test where the cells are subject to C/3 cycling with a C/10 cycle at every 10th cycle. The decrease of peak intensities indicates capacity fading. Compared to pristine silicon monoxide, the heat-treated silicon monoxide samples all showed much less decrease in peak intensity, demonstrating much better capacity retention during cycling. For silicon monoxide samples heat-treated at 1000° C., two new delithiation peaks appear and increase with cycling due to the significant increase of the size of the silicon crystalline nanodomains.

Figure 6:
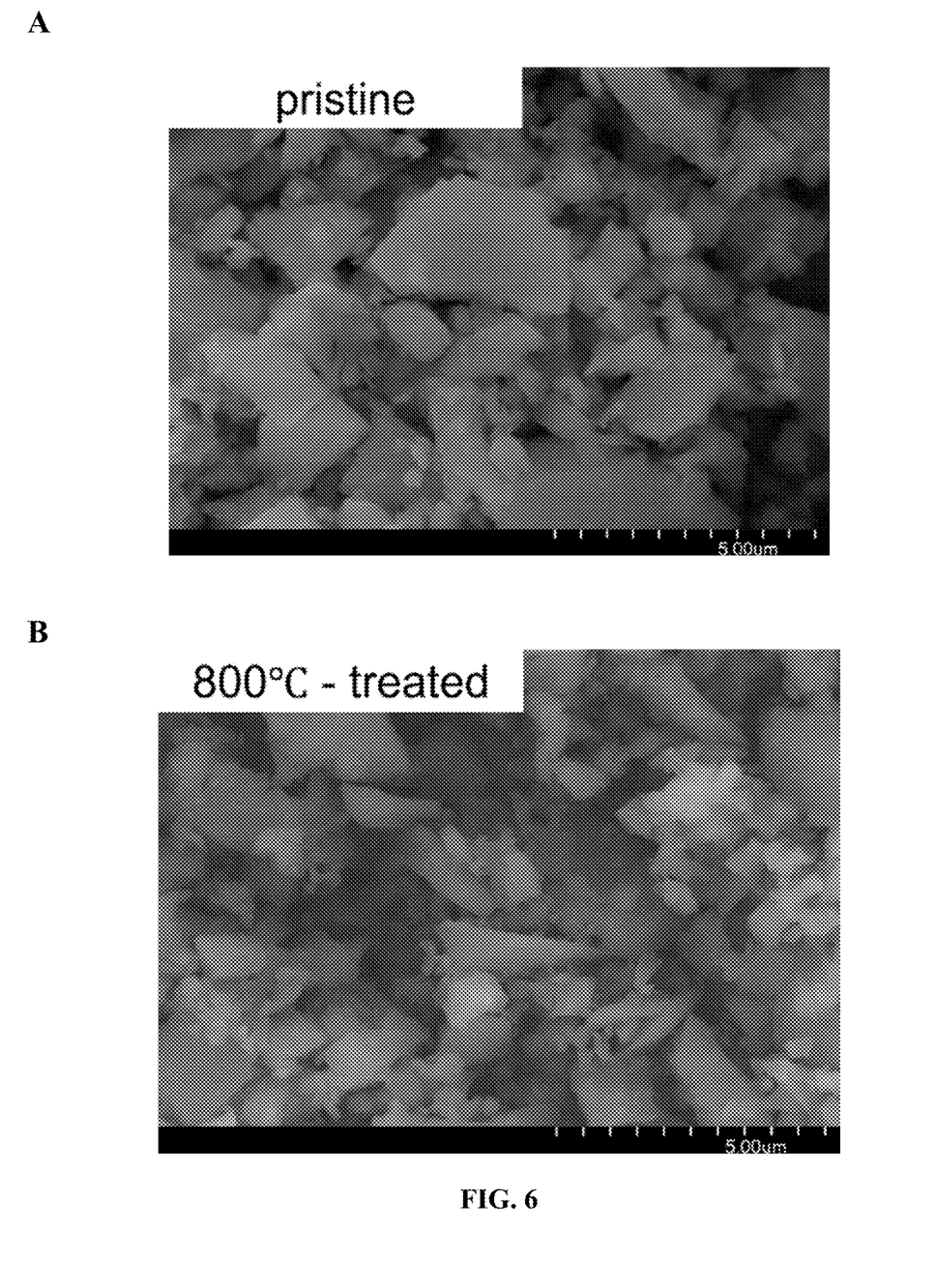
FIG. 6 provides SEM images of silicon monoxide (Panel A) and silicon monoxide that was heat-treated at 800° C. (Panel B).

FIG. 6 provides scanning electron microscope (SEM) images of silicon monoxide (Panel A) and silicon monoxide that was heat-treated at about 800° C. (Panel B). As is seen in FIG. 6, heating the silicon oxide at about 800° C. did not result in significant change in particle size and shape, demonstrating that no significant sintering occurred during the heat treatment.

Figure 7:
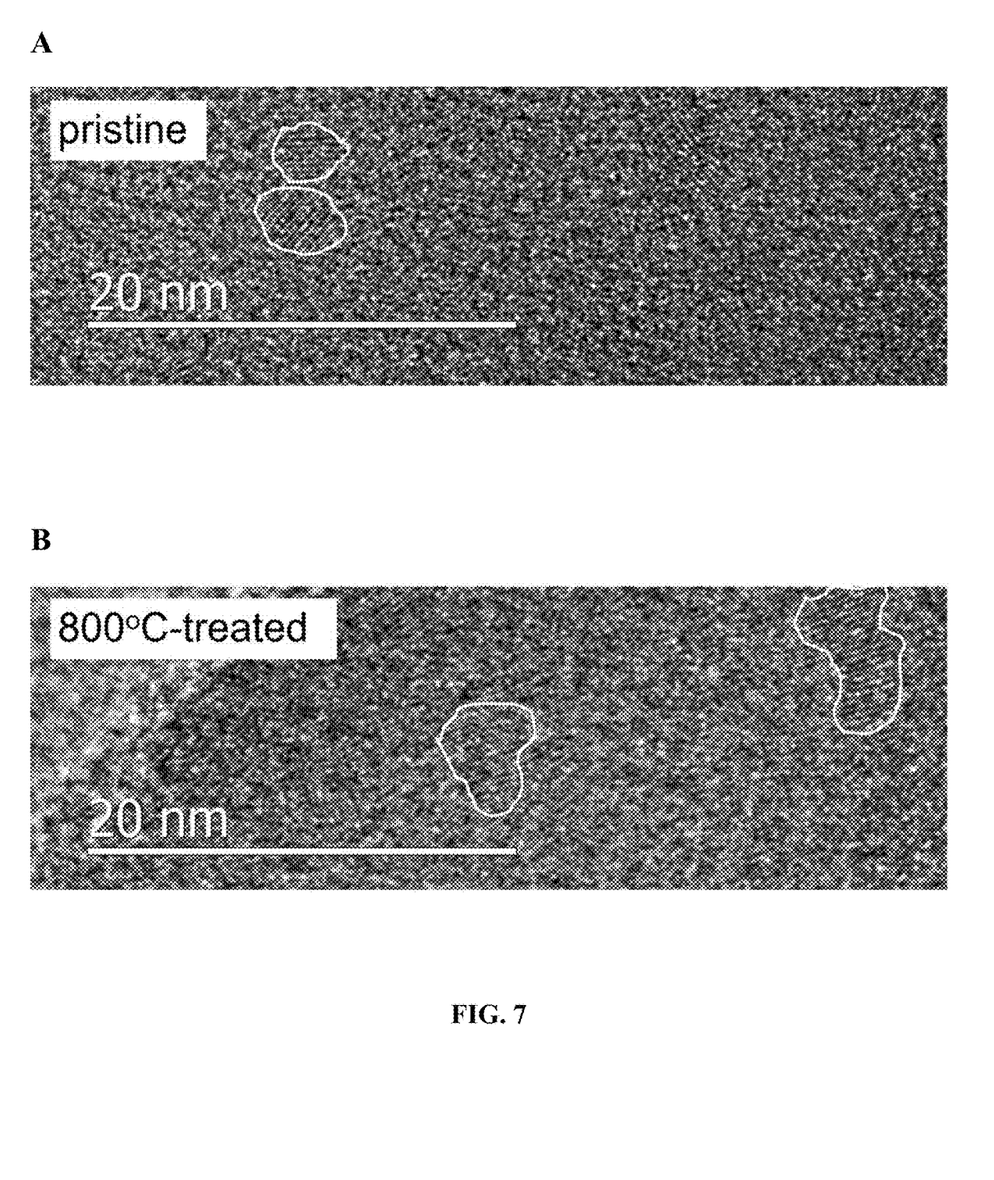
FIG. 7 provides TEM images of silicon monoxide (Panel A) and silicon monoxide that was heat-treated at 800° C. (Panel B).

FIG. 7 provides exemplary transmission electron microscope (TEM) images of silicon monoxide (Panel A) and silicon monoxide that was heat-treated at about 800° C. (Panel B). As is seen in FIG. 7, heating the silicon at about 800° C. resulted in an increase of the size of the silicon nanodomains (outlined in white) embedded in the amorphous silicon oxide matrix. The silicon nanodomains also appeared to be more evenly distributed in the heat-treated samples.

Example 4. Electrochemical Cells

Figure 8:
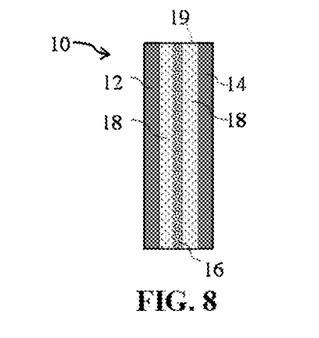
FIG. 8 schematically illustrates a lithium-ion electrochemical cell.
Figure 9:
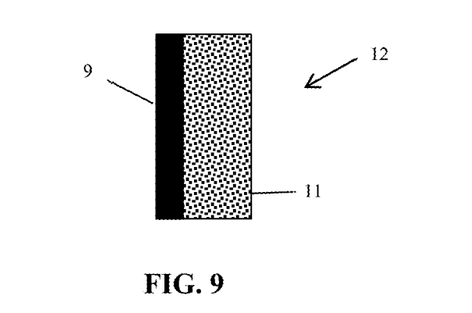
FIG. 9 schematically illustrates an anode comprising a current collector and the anode active silicon oxide particles described herein.
Figure 10:
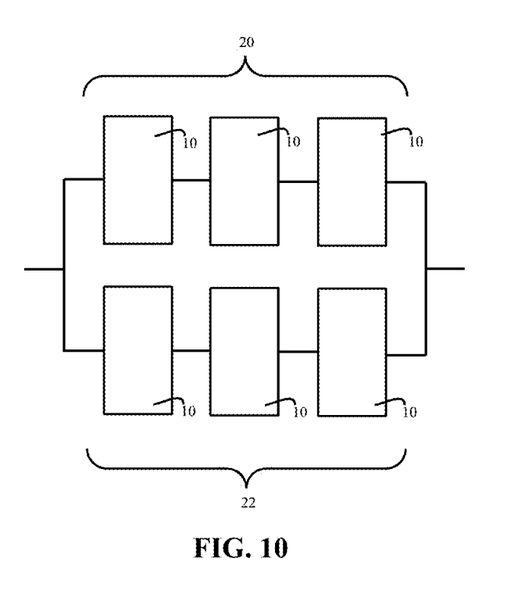
FIG. 10 schematically illustrates a lithium-ion battery.

FIG. 8 schematically illustrates a cross-sectional view of lithium-ion electrochemical cell 10 comprising cathode 12, and anode 14, with porous separator 16 between cathode 12 and anode 14. Electrolyte 18, comprising a solution of a lithium salt in a non-aqueous solvent contacts electrodes 12 and 14 and separator 16. The electrodes, separator and electrolyte are sealed within housing 19. FIG. 9 schematically illustrates details of anode 12, including transition metal (e.g., copper) current collector 9 coated with silicon oxide particles 11, as described herein. Optionally the particles 11 can include a carbon coating. FIG. 10 schematically illustrates a lithium-ion battery comprising a first array 20 consisting of three series-connected electrochemical cells 10, and a second array 22 consisting of three series-connected electrochemical cells 10, in which first array 20 is electrically connected to second array 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Embodiments of the invention in which an exclusive property or privilege is claimed are defined as follows:

1. A negative electrode for a lithium-ion battery, the negative electrode comprising particles coated on a transition metal current collector; the particles consisting of nanocrystalline domains of silicon dispersed within a silicon oxide matrix; wherein the particles have an average diameter in the range of about 20 nm to about 10 μm as determined by laser light scattering particle size analysis; the nanocrystalline domains of silicon comprise about 10 to about 90 mol % of the particles; the nanocrystalline domains have an average diameter of about 0.2 nm to about 50 nm, as determined by transmission electron microscopy; the silicon oxide matrix comprises silicon dioxide and silicon monoxide; and the nanocrystalline domains of silicon and the silicon dioxide are formed by heating particles of silicon monoxide at a temperature in the range of 600 to 800° C.

2. The negative electrode of claim 1, wherein the nanocrystalline domains of silicon have an average diameter in the range of about 0.5 to about 20 nm as determined by transmission electron microscopy.

3. The negative electrode of claim 1, wherein the particles have an average diameter in the range of 100 nm to about 5 μm as determined by laser light scattering particle size analysis.

4. The negative electrode of claim 1, wherein the current collector comprises a transition metal foil.

5. The negative electrode of claim 1, wherein the nanocrystalline domains of silicon comprise about 30 to about 70 mol % of the particles.

6. A non-aqueous lithium-ion electrochemical cell comprising a positive electrode, a negative electrode of claim 1, a porous separator membrane between the positive electrode and the negative electrode, and a non-aqueous solution of a lithium salt contacting the electrodes and membrane.

7. A non-aqueous lithium-ion battery comprising a plurality of electrochemical cells of claim 6 electrically connected in series, in parallel or in both series and parallel.

* * * * *